United States Patent
Liu et al.

(10) Patent No.: US 7,746,440 B2
(45) Date of Patent: Jun. 29, 2010

(54) FLAT DISPLAY PANEL HAVING STRENGTH ENHANCING STRUCTURE

(75) Inventors: Yu-Chen Liu, Hsin-Chu (TW);
Jong-Wen Chwu, Hsin-Chu (TW);
Chao-Cheng Lin, Hsin-Chu (TW);
Jer-Yao Wu, Hsin-Chu (TW);
Ping-Feng Yu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 184 days.

(21) Appl. No.: 12/104,448

(22) Filed: Apr. 17, 2008

(65) Prior Publication Data
US 2009/0128760 A1 May 21, 2009

(30) Foreign Application Priority Data
Nov. 19, 2007 (TW) .............................. 96143674 A

(51) Int. Cl.
*G02F 1/1339* (2006.01)
(52) U.S. Cl. ....................................... 349/153; 349/154
(58) Field of Classification Search ......... 349/121–123, 349/150–154
See application file for complete search history.

(56) References Cited

U.S. PATENT DOCUMENTS

| 6,327,011 B2 | 12/2001 | Kim |
| 6,930,748 B2 * | 8/2005 | Moon ......................... 349/158 |
| 6,955,840 B2 * | 10/2005 | Kim ........................... 428/1.51 |
| 7,211,738 B2 * | 5/2007 | Lee et al. ..................... 174/262 |
| 2003/0124831 A1 * | 7/2003 | Hsiao et al. .................. 438/613 |
| 2003/0160921 A1 * | 8/2003 | Nakashima et al. ......... 349/113 |
| 2004/0209389 A1 * | 10/2004 | Liang .......................... 438/30 |

FOREIGN PATENT DOCUMENTS

| CN | 1679132 A | 10/2005 |
| CN | 101009300 A | 8/2007 |
| EP | 1553612 | 7/2005 |

* cited by examiner

*Primary Examiner*—Akm E Ullah
(74) *Attorney, Agent, or Firm*—Winston Hsu

(57) ABSTRACT

A flat display panel includes a first substrate, a second substrate opposite to the first substrate, a sealant disposed between the first and second substrates. The sealant, the edge of the inner surface of the first substrate, and the edge of the inner surface of the second substrate form a space, and the flat display panel further includes a protection layer disposed inside the space so as to reinforce the structural strength of the flat display panel.

11 Claims, 10 Drawing Sheets

| | Without the protection layer | With the protection layer |
|---|---|---|
| Average pressing force | 298.8 N | 450.4 N |
| Standard deviation | 82.5 | 118.0 |

FIG. 8

| | Without the protection layer | With the protection layer |
|---|---|---|
| Average bending force | 4.12 Kgw | 7.25 Kgw |
| Standard deviation | 0.37 | 0.96 |

FIG. 10

FLAT DISPLAY PANEL HAVING STRENGTH ENHANCING STRUCTURE

BACKGROUND OF THE INVENTION

1. Field of the Invention

The present invention relates to a flat display panel, and more particularly, to a flat display panel having a strength enhancing structure.

2. Description of the Prior Art

A flat display panel, such as a liquid crystal display panel, substantially consists of two transparent glass substrates, control devices formed on one of the substrates, filters formed on another substrate, and liquid crystals filling gaps between the two substrates. During the process of manufacturing the flat display panel, a thinning process is performed on the flat display panel after the two glass substrates are assembled, so the thickness of the flat display panel can be reduced to a predetermined value. Generally speaking, the surfaces of the glass substrates are etched in whole by an etching process for thinning the entire glass substrates. However, the etching process frequently leads to undesired dimples on the surfaces of the glass substrates, and both numbers and sizes of the dimples increase with the etching depth. In addition, defects such as scratches or cracks are unavoidably formed on surfaces of the glass substrates during procedures of the manufacturing process.

Please refer to FIG. 1, which is a schematic diagram illustrating defects of the conventional flat display panel. As shown in FIG. 1, after the conventional flat display panel 10 is fabricated, defects such as dimples 12, scratches 14 and cracks 16 occur during the thinning process, cutting process, transmission, and so on. The entire structural strength of the flat display panel 10 is reduced due to the defects, so the formed flat display panel 10 often fails in the subsequently bending test, squeeze test, or pull test. As a result, the yield of the flat display panels is undesirably affected.

SUMMARY OF THE INVENTION

It is therefore one of the objectives of the claimed invention to provide a flat display panel having a strength enhancing structure. According to the claimed invention, a flat display panel is provided. The flat display panel includes a first substrate, a second substrate, a sealant and a protection layer. The second substrate is disposed opposite to the first substrate, so that the first substrate and the second substrate overlap partially. An inner surface of the second substrate facing the first substrate has at least a bonding pad area, and the bonding pad area does not overlay the first substrate. The sealant is disposed between an inner surface of the first substrate that faces the second substrate and the inner surface of the second substrate that faces the first substrate for connecting the first and second substrate. Therefore, the sealant, the edge of the inner surface of the first substrate and the edge of the inner surface of the second substrate form a space. The protection layer is disposed in the space to enhance the structural strength of the flat display panel.

The protection layer applied to the flat display panel of the present invention can effectively enhance the structural strength of the flat display panel, and the structural strength is less affected by the defects.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 shows the test result of the ring-on-ring test.

FIG. 10 shows the test result of the four-way bending test.

DETAILED DESCRIPTION

Figure 1:
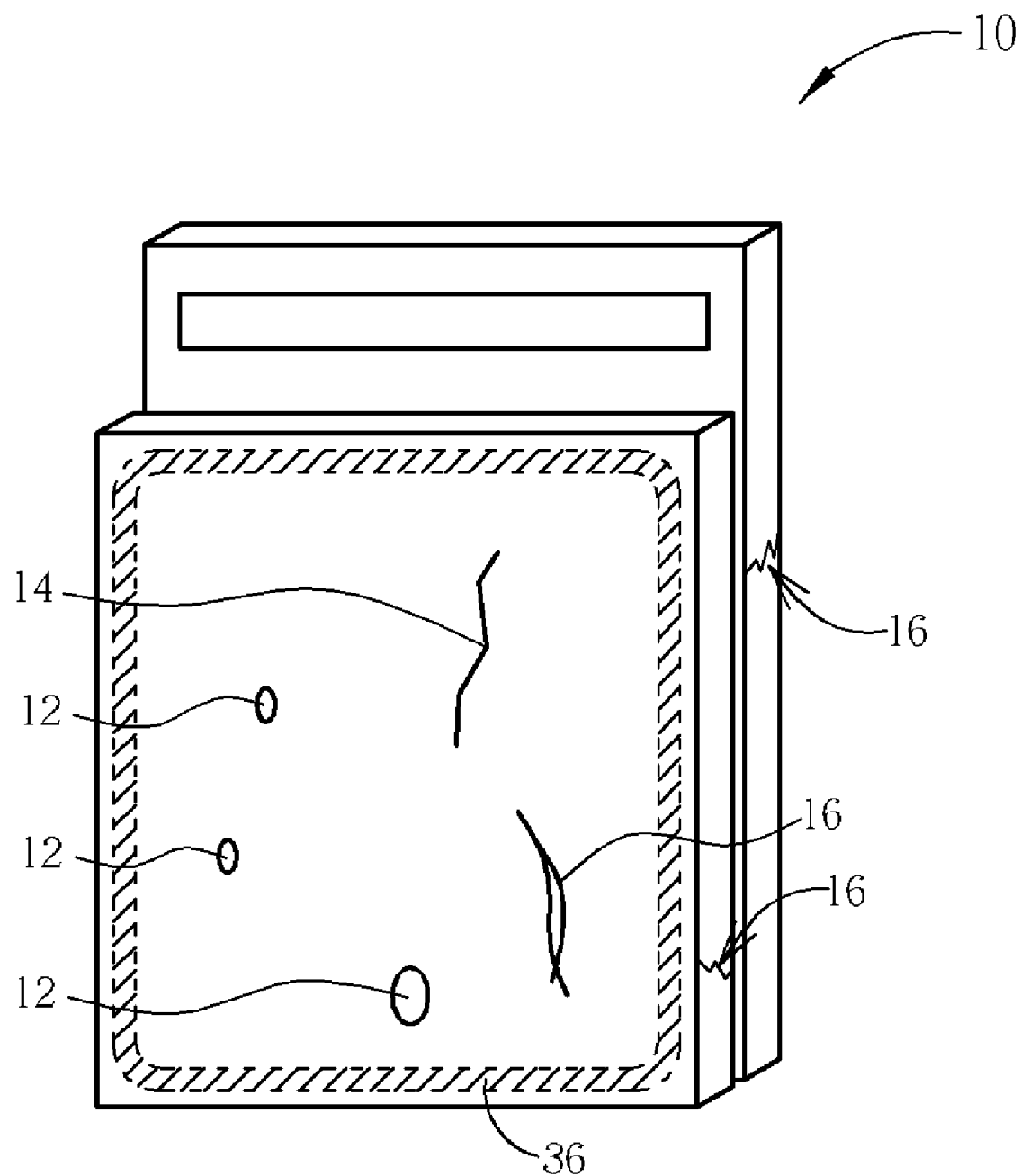
FIG. 1 is a schematic diagram illustrating defects of the conventional flat display panel.
Figure 2:
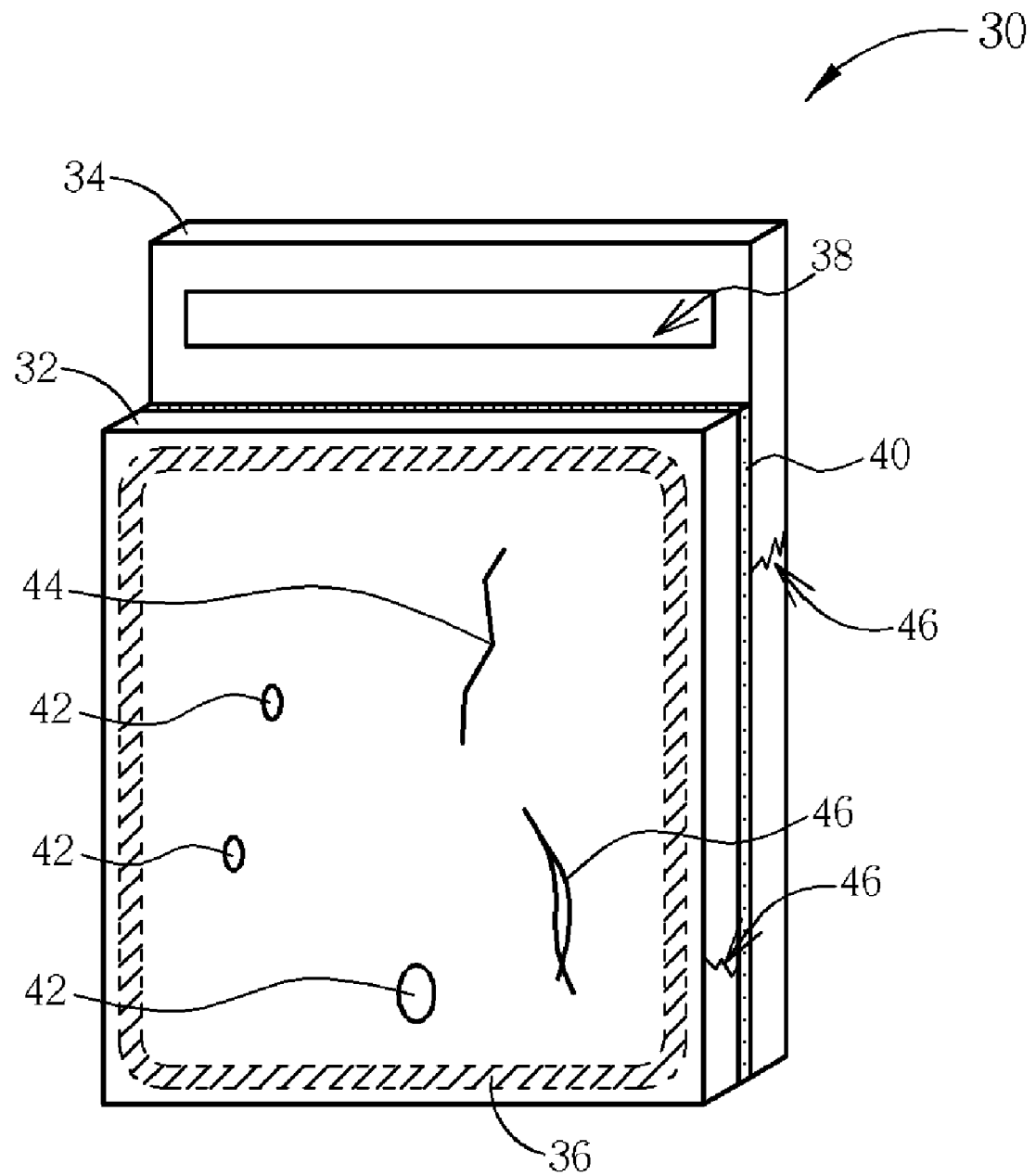
FIG. 2 is a schematic diagram illustrating a flat display panel according to a preferred embodiment of the present invention in an oblique view.
Figure 3:
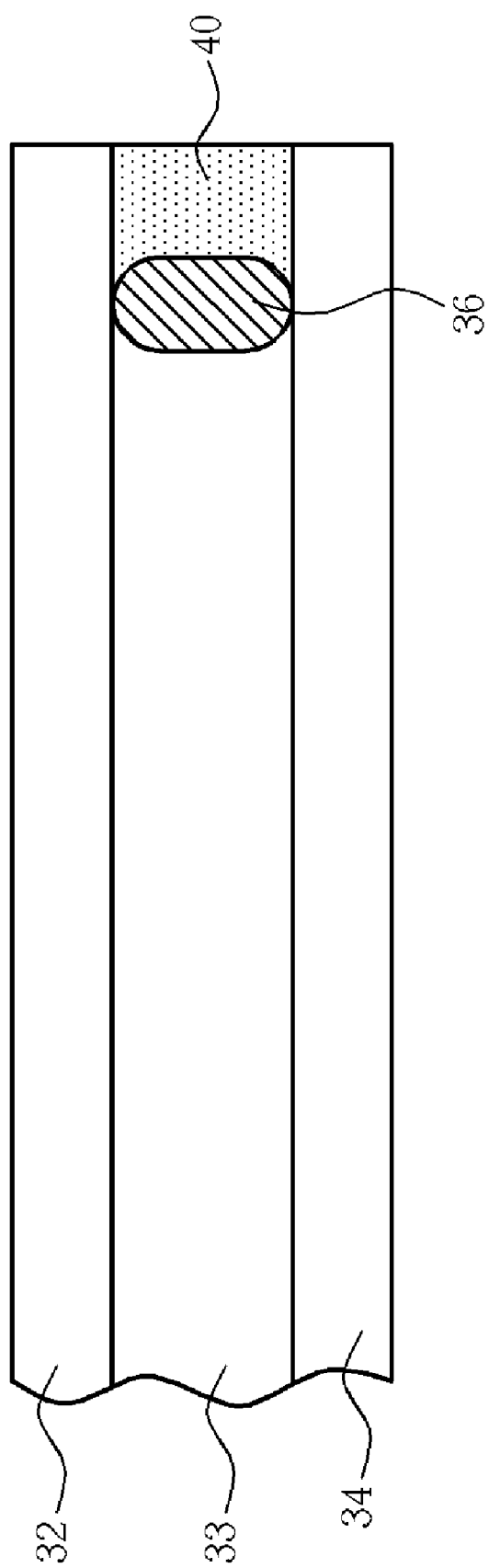
FIG. 3 is a schematic cross-sectional diagram illustrating the flat display panel shown in FIG. 2.

Please refer to FIG. 2 and FIG. 3. FIG. 2 and FIG. 3 are schematic diagrams illustrating a flat display panel according to a preferred embodiment of the present invention, where FIG. 2 shows an oblique view of the flat display panel, and FIG. 3 shows a cross-section of the flat display panel. As shown in FIG. 2 and FIG. 3, the flat display panel 30 includes a first substrate 32, a second substrate 34 opposite to the first substrate 32, and a sealant 36 for connecting the first substrate 32 with the second substrate 34 in this embodiment. It should be noted that a liquid crystal display panel is only drawn for clarity of illustration in this embodiment, and the flat display panel of the present invention should not be limited to the above liquid crystal display panel. The flat display panel can be of various types, such as an electroluminescent panel or a plasma display panel. In this embodiment, the first substrate 32 can be a color filter substrate having a color filter (not shown) on its inner surface, and the second substrate 34 can be an array substrate having a control device (not shown) thereon. Liquid crystals 33 are sealed by the sealant 36, and therefore are disposed between the first substrate 32 and the second substrate 34.

The sealant 36 is positioned between the first substrate 32 and the second substrate 34. Specifically speaking, the sealant 36 is disposed between an inner surface of the first substrate 32 that faces the second substrate 32 and the inner surface of the second substrate 34 that faces the first substrate 32. As illustrated in FIG. 2, the sealant 36 can surround the overlap between the first substrate 32 and the second substrate 34 to seal the liquid crystals 33 and to connect the first substrate 32 with the second substrate 34.

The size of the second substrate 34 of the flat display panel 30 can be somewhat larger than the size of the first substrate 32 in this embodiment. Thus, the first substrate 32 can overlap the second substrate 34, and at least a bonding pad area 38 included on the inner surface of the second substrate 34 can be exposed by the first substrate 32. The bonding pad area 38 is applied for electrically connecting with driver integrated circuits (driver IC) or other components of a circuit board.

One characteristic of this embodiment is that the sealant 36, the edge of the inner surface of the first substrate 32, and the edge of the inner surface of the second substrate 34 form a space, and the flat display panel 30 includes a protection layer 40 disposed inside the space to reinforce the structural strength of the flat display panel 30. The protection layer 40 is utilized to enhance the structural strength of the flat display panel 30 without affecting the display quality of the flat display panel 30. Therefore, transparent materials, light-pervious materials, and/or materials having a refractive index between 1.0 and 1.5 in a liquid state are suitable for the protection layer 40. The protection layer 40 can include organic materials, such as adhesive material having at least an acryl group, or inorganic materials, such as a silica-based material coated on the substrates. According to the characteristics of different materials, different forming procedures, such as dispensing, dipping, coating, and spraying, can be applied for forming the protection layer 40, and different curing processes can be adopted to make the protection layer 40 adhere to the flat display panel 30 tightly. For example, if the used material includes a photo-sensitive material, the protection layer 40 can be cured by light, such as visible light, ultraviolet, or infrared rays. If the used material is thermosetting, the protection layer 40 can be cured by baking. The protection layer 40 of the flat display panel 30 is disposed inside the space formed by the sealant 36, the edge of the inner surface of the first substrate 32, and the edge of the inner surface of the second substrate 34 in this embodiment so as to reinforce the structural strength of the flat display panel 30. In such a case, even when defects such as dimples 42, scratches 44 and cracks 46 (shown in FIG. 2) occur on the outer surfaces or the side surfaces of the first substrate 32 and the second substrate 34, the first substrate 32 and the second substrate 34 do not break in the subsequent bending test, squeeze test or the pull test. It deserves to be mentioned that the position of the protection layer of the flat display panel should not be limited to the above-mentioned embodiment in the present invention, and can be adjusted in other embodiments, as shown in the following description. In order to compare the differences between each embodiment of the present invention and exemplify the features of each embodiment, like elements are denoted by like numerals, and are not detailed redundantly. The following description only mentions the differences between each embodiment.

Figure 4:
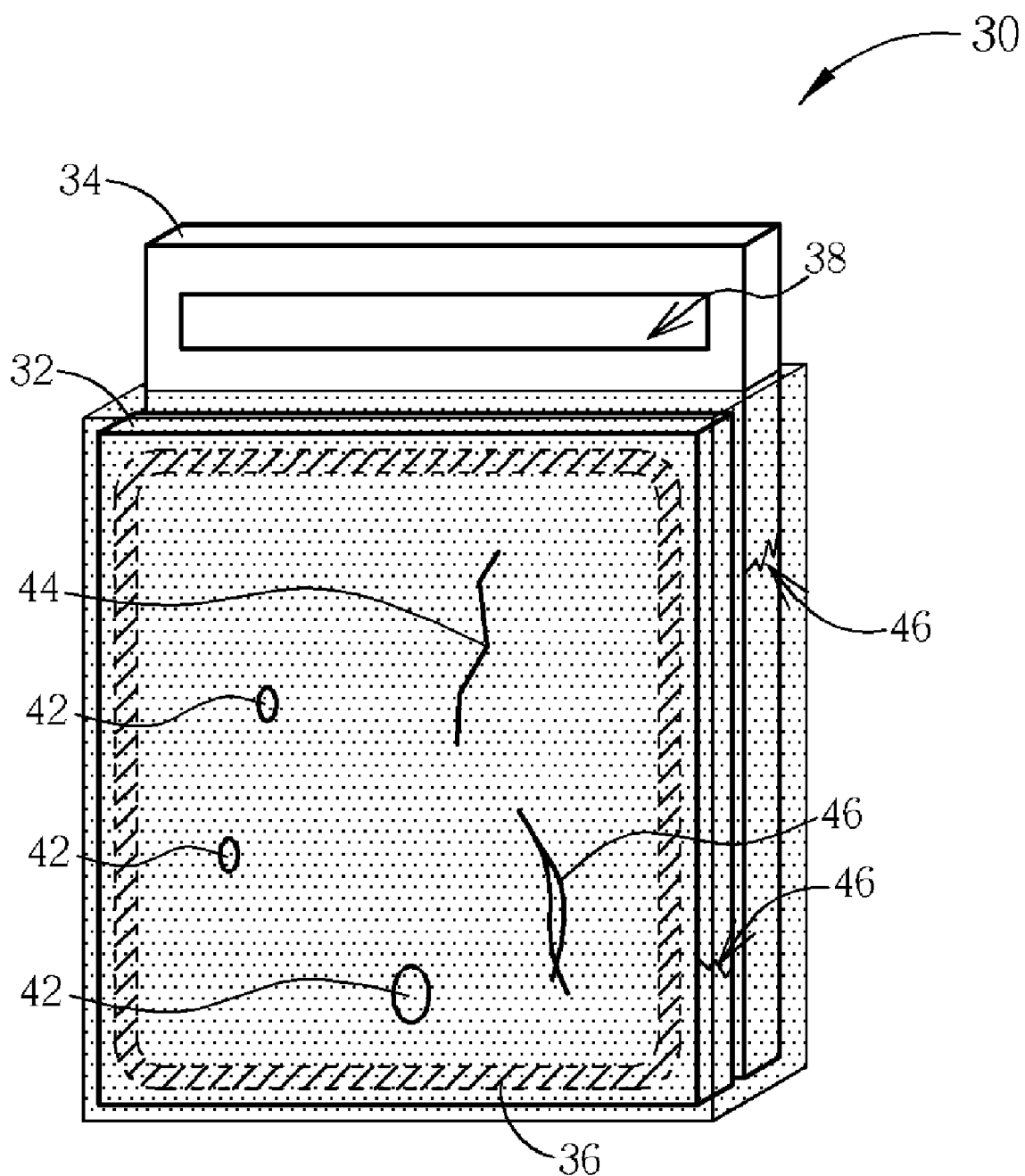
FIG. 4 is a schematic diagram illustrating a flat display panel according to another preferred embodiment of the present invention in an oblique view.
Figure 5:
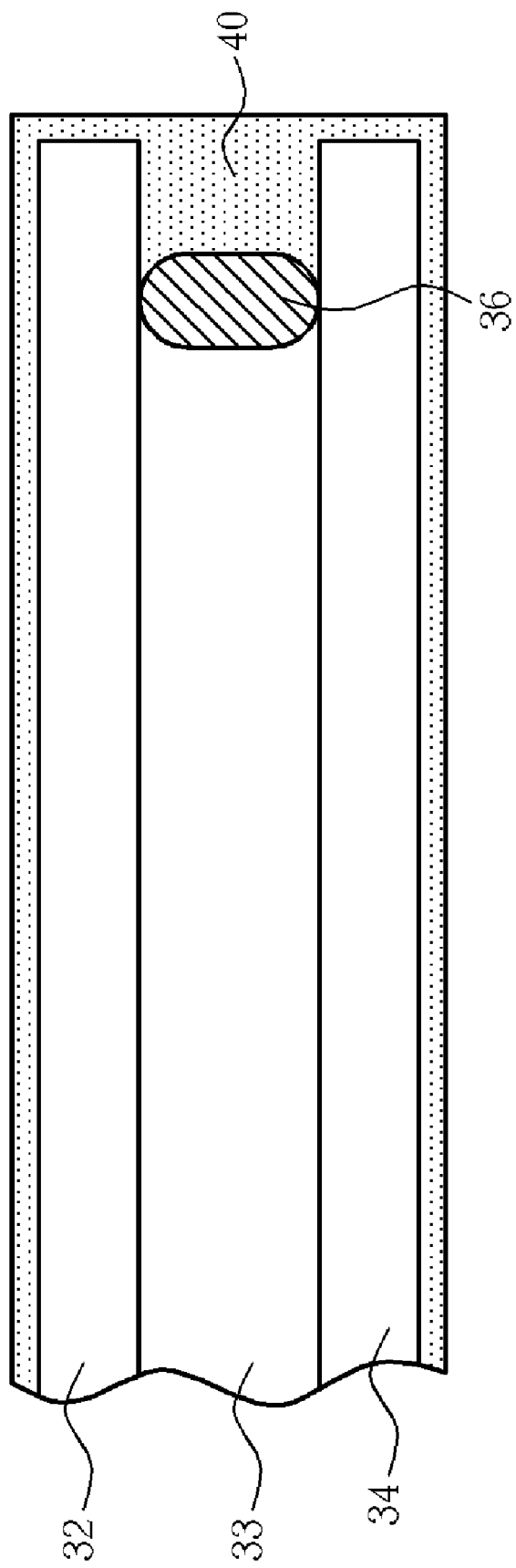
FIG. 5 is a schematic cross-sectional diagram illustrating the flat display panel shown in FIG. 4.

Please refer to FIG. 4 and FIG. 5. FIG. 4 and FIG. 5 are schematic diagrams illustrating a flat display panel according to another preferred embodiment of the present invention, where FIG. 4 shows an oblique view of the flat display panel, and FIG. 5 shows a cross-section of the flat display panel. As shown in FIG. 4 and FIG. 5, the protection layer 40 not only fills the space formed by the sealant 36, the edge of the inner surface of the first substrate 32, and the edge of the inner surface of the second substrate 34, but also covers the outer surfaces and the side surfaces of the first substrate 32 and the second substrate 34 in this embodiment. In such a case, the protection layer 40 can cover the defects, such as the dimples 42, the scratches 44, and the cracks 46, formed on the outer surfaces and the side surfaces of the first substrate 32 and the second substrate 34, so the structural strength of the flat display panel 30 can be further reinforced. Since the protection layer 40 can include the transparent and light-pervious materials as mentioned, the protection layer 40 does not disturb light emitted from the backlight unit passing through the flat display panel 30. In the present invention, the thickness of the protection layer 40 can be adjusted according to its material or the requirement of the structural strength. For instance, the thickness of the protection layer 40 can be in a range from several micrometers to several hundred micrometers, and should not be limited to this range.

Figure 6:
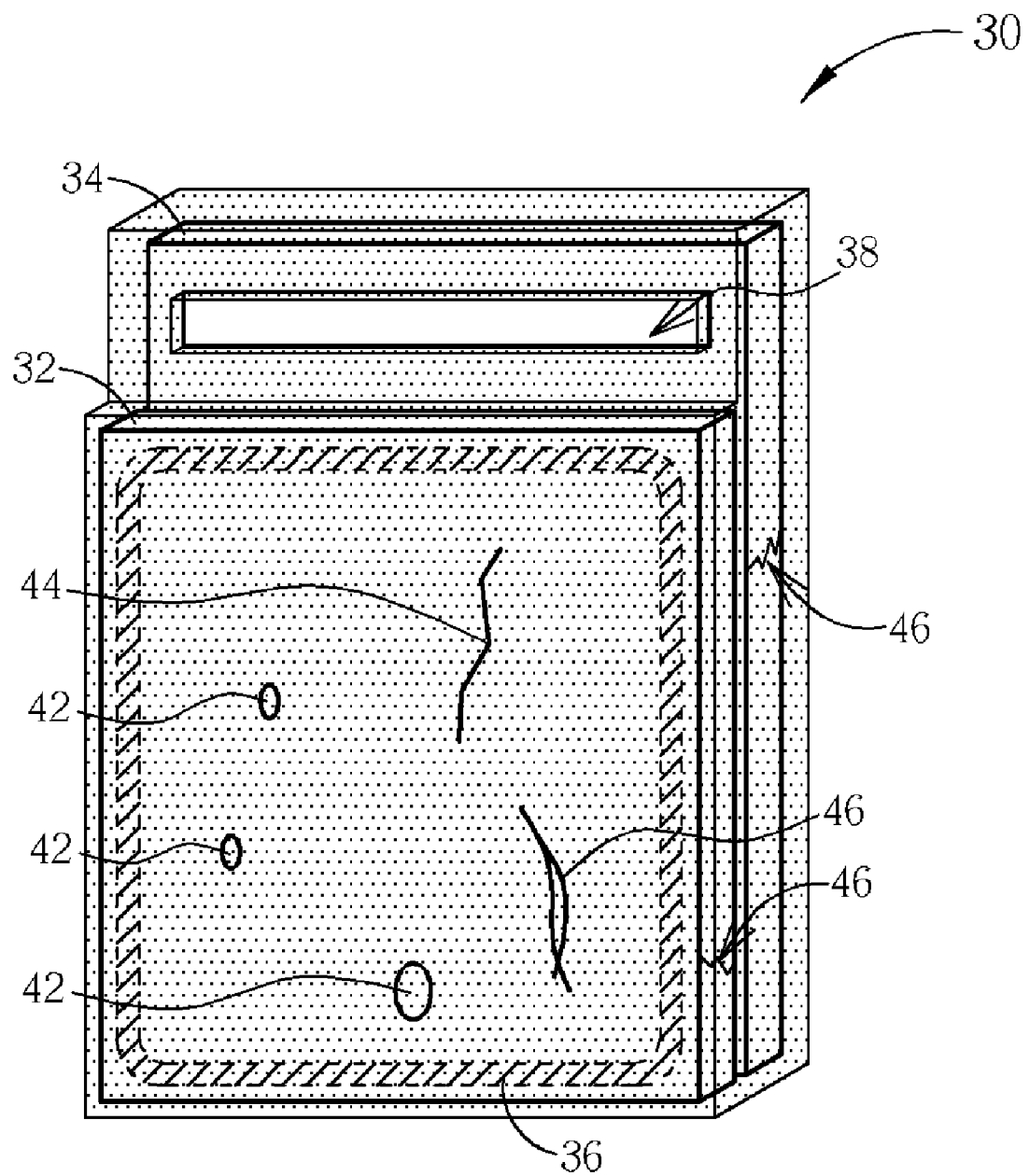
FIG. 6 is a schematic diagram illustrating a flat display panel according to another preferred embodiment of the present invention.

Please refer to FIG. 6, which is a schematic diagram illustrating a flat display panel according to another preferred embodiment of the present invention. As shown in FIG. 6, the main difference between the foregoing embodiment and this embodiment is that the protection layer 40 of the flat display panel 30 in this embodiment further covers parts of the inner surface of the second substrate 34, which are not covered by the first substrate 32, and exposes the bonding pad area 38 for external connection. In other words, the protection layer 40 can cover all the surfaces of the flat display panel 30 except for the bonding pad area 38 in this embodiment, and fills the space formed by the sealant 36, the edge of the inner surface of the first substrate 32, and the edge of the inner surface of the second substrate 34.

The protection layer of the present invention is formed before the process of bonding the polarizing sheet to the liquid crystal pane, so the protection layer can fill the dimples, the scratches, and the cracks on the glass substrates, and the structural strength is therefore less affected by the defects. It is worthy of note that the protection layer, which fills the space formed by the sealant, the edge of the inner surface of the first substrate, and the edge of the inner surface of the second substrate, can further protect the sealant from deterioration, and can therefore elongate the lifetime of the flat display panel.

Figure 7:
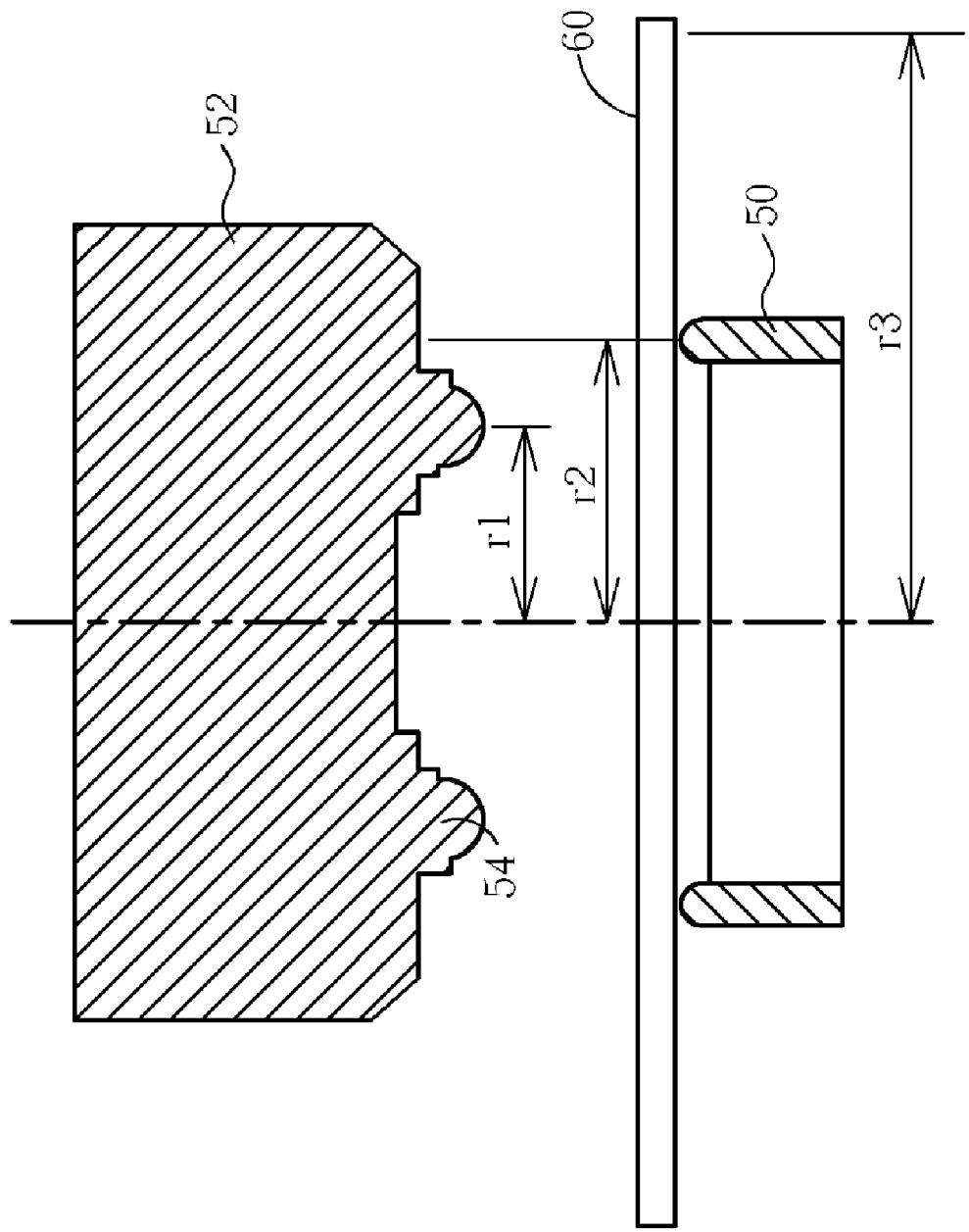
FIG. 7 is a schematic diagram showing a flat display panel undergoing a ring-on-ring test for measuring the surface strength.

Please refer to FIG. 7 and FIG. 8. FIG. 7 is a schematic diagram showing a flat display panel undergoing a ring-on-ring test for measuring the surface strength, and FIG. 8 shows the test result of the ring-on-ring test on the flat display panel. As shown in FIG. 7, the ring-on-ring testing apparatus includes a support ring-like substrate 50, called support ring, and a pressing head 52 providing a downward force, where the pressing head 52 has a ring-like protrusion 54, called loading ring, at the bottom. In the test, the flat display panel 60 is first disposed on the support ring 50 of the ring-on-ring testing apparatus to be tested. Subsequently, the pressing head 52 is moved downward, and the loading ring 54 contacts the flat display panel 60. Thereafter, the downward force continuously increases until the loading ring 54 breaks the flat display panel 60. The surface strength of the flat display panel 60 can be calculated according to the downward force value, and the test result shows that the surface strength can be affected by the defects, such as the dimples 42, the scratches 44, and the cracks 46, formed on the outer surfaces of the first substrate 32 and the second substrate 34. As shown in FIG. 8, the average bearing force of pressing the flat display panel is about 298.8 newtons (N) without the protection layer, while the standard deviation is approximately 82.5. When the protection layer fills the defects, the average bearing force of the flat display panel can be increased to 450.4 N, and the standard deviation is about 118.

Figure 9:
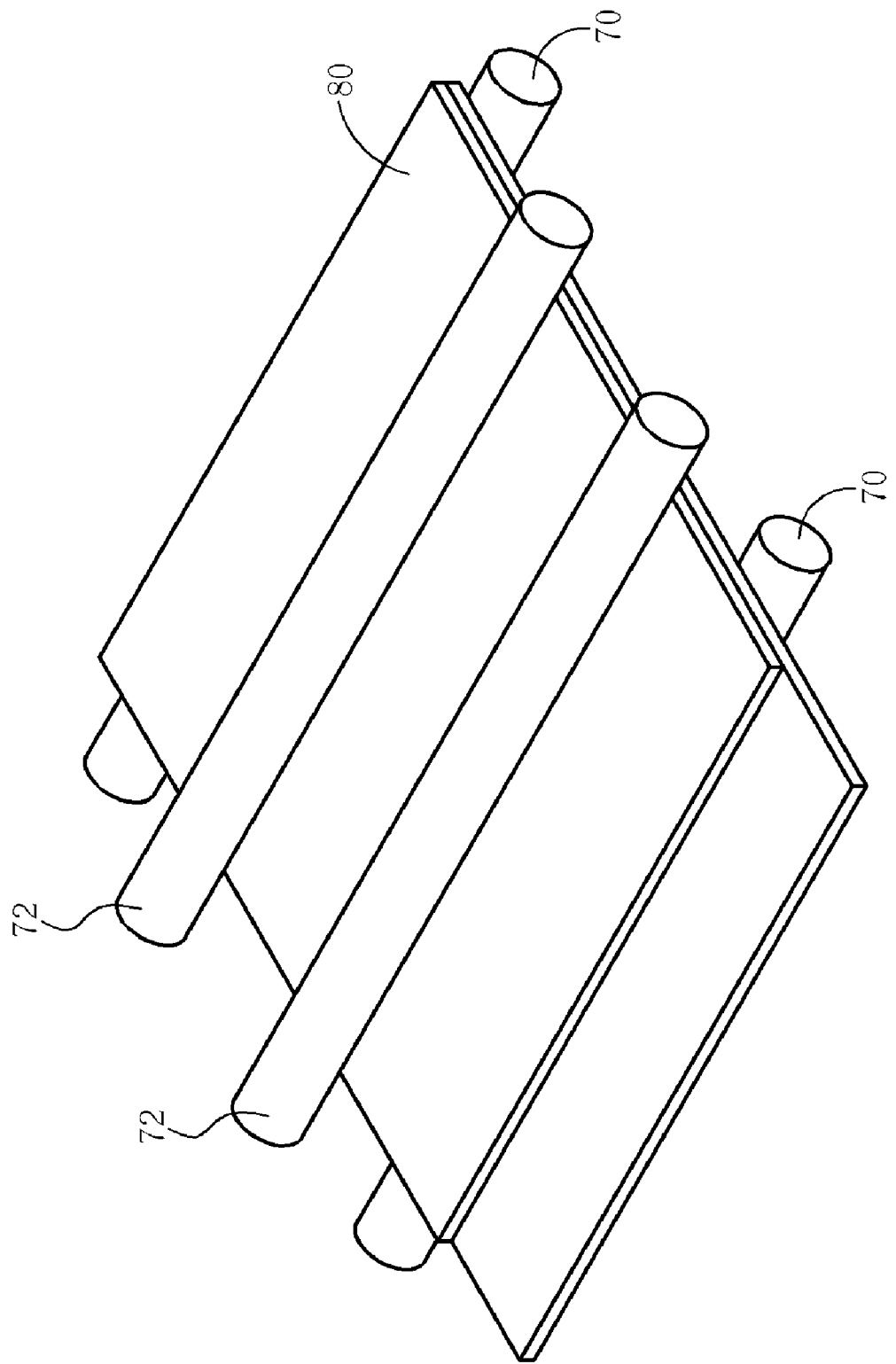
FIG. 9 is a schematic diagram showing a flat display panel undergoing a four-way bending test for measuring the edge strength.

Please refer to FIG. 9 and FIG. 10. FIG. 9 is a schematic diagram showing a flat display panel undergoing a four-way bending test for measuring the edge strength, and FIG. 10 shows the test result of the four-way bending test on the flat display panel. As shown in FIG. 9, the four-way bending test apparatus includes two support bars 70 and two pressing bars 72, where the distance between the support bars 70 is longer than the distance between the pressing bars 72. In the test, the flat display panel 80 is first disposed between the support bars 70 and the pressing bars 72 to be tested. Subsequently, a downward force is provided from the pressing bars 72 to the flat display panel 80, and the downward force continuously increases until the pressing bars 72 break the flat display panel 80. The edge strength of the flat display panel 80 can be calculated according to the downward force value, and the test result shows that the edge strength is affected by the defects, such as the dimples 42, the scratches 44, and the cracks 46, formed on the side surfaces of the first substrate 32 and the second substrate 34. As shown in FIG. 10, the average bearing force for bending the flat display panel is about 4.12 kilogram weights (kgw) without the protection layer, while the standard deviation is about 0.37. When the protection layer is applied to the flat display panel, the average bearing force for bending the flat display panel can be increased to 7.25 kgw, and the standard deviation is about 0.96.

In sum, the present invention utilizing the protection layer disposed on the surfaces and edges of the flat display panel can effectively reinforce the structural strength of the flat display panel. Therefore, the structural strength is less affected by the defects, and the display quality can also be kept. In addition, the sealant can be protected from deterioration in the present invention.

Those skilled in the art will readily observe that numerous modifications and alterations of the device and method may be made while retaining the teachings of the invention.

What is claimed is:

1. A flat display panel, comprising:
   a first substrate;
   a second substrate disposed opposite to the first substrate and overlapping the first substrate, an inner surface of the second substrate facing the first substrate and having at least a bonding pad area, the bonding pad area not overlaying the first substrate;
   a sealant disposed between an inner surface of the first substrate that faces the second substrate and the inner surface of the second substrate that faces the first substrate for connecting the first substrate and the second substrate, so that the sealant, the edge of the inner surface of the first substrate and the edge of the inner surface of the second substrate form a space; and
   a protection layer disposed in the space to enhance the structural strength of the flat display panel, wherein the protection is in contact with an inner surface of the first substrate that faces the second substrate and the inner surface of the second substrate that faces the first substrate.

2. The flat display panel of claim 1, wherein the protection layer further covers parts of the inner surface of the second substrate, which are not covered by the first substrate.

3. The flat display panel of claim 2, wherein the protection layer exposes the bonding pad area.

4. The flat display panel of claim 1, wherein the protection layer further covers an outer surface of the first substrate and/or an outer surface of the second substrate.

5. The flat display panel of claim 1, wherein the protection layer further covers a side surface of the first substrate and/or a side surface of the second substrate.

6. The flat display panel of claim 1, wherein the flat display panel comprises a liquid crystal display panel.

7. The flat display panel of claim 1, wherein the first substrate comprises a color filter substrate, and the second substrate comprises an array substrate.

8. The flat display panel of claim 1, wherein the protection layer is transparent.

9. The flat display panel of claim 1, wherein the protection layer comprises a material having a refractive index between 1.0 and 1.5 in a liquid state.

10. The flat display panel of claim 1, wherein the protection layer comprises a photosensitive material.

11. The flat display panel of claim 1, wherein the protection layer comprises a colloid material having at least an acryl group, or a silica-based material.

* * * * *